(12) United States Patent
Leventhal

(10) Patent No.: US 6,450,590 B1
(45) Date of Patent: *Sep. 17, 2002

(54) CONTROL VALVE WITH REDUCED SEAT FOR A HYDRAULIC CONTROL UNIT

(75) Inventor: Leon Leventhal, Livonia, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/672,402

(22) Filed: Sep. 28, 2000

(51) Int. Cl.$^7$ ................................................ B60T 8/36
(52) U.S. Cl. ................ 303/119.2; 251/129.15; 251/129.02
(58) Field of Search .................... 303/119.1, 119.2, 303/119.3; 251/129.15, 129.02, 129.08

(56) References Cited

U.S. PATENT DOCUMENTS

| | | | | |
|---|---|---|---|---|
| 4,021,152 A | * | 5/1977 | Toyoda | 417/417 |
| 4,791,958 A | * | 12/1988 | Brundage | 137/528 |
| 4,941,447 A | | 7/1990 | Mannhardt | |
| 4,961,561 A | | 10/1990 | Kamibayasi | |
| 5,011,113 A | | 4/1991 | Stobbs et al. | |
| 5,253,676 A | | 10/1993 | Craig | |
| 5,364,067 A | * | 11/1994 | Linkner, Jr. | 251/129.02 |
| 5,669,675 A | * | 9/1997 | Mueller et al. | 303/119.2 |
| 5,752,750 A | * | 5/1998 | Lubischer et al. | 303/119.2 |
| 5,791,747 A | | 8/1998 | Sorensen et al. | |
| 5,810,330 A | | 9/1998 | Eith et al. | |
| 5,887,621 A | | 3/1999 | Doll | |
| 6,026,847 A | * | 2/2000 | Reinicke et al. | 137/487.5 |
| 6,029,703 A | * | 2/2000 | Erickson et al. | 137/625.61 |
| 6,047,945 A | * | 4/2000 | Grove et al. | 251/68 |
| 6,065,495 A | * | 5/2000 | Fong et al. | 137/625.25 |
| 6,065,734 A | * | 5/2000 | Tackett et al. | 251/129.02 |
| 6,113,066 A | * | 9/2000 | Hohl et al. | 251/129.02 |
| 6,161,539 A | * | 12/2000 | Winter | 128/205.24 |

* cited by examiner

Primary Examiner—Paul N. Dickson
Assistant Examiner—Xuan Lan Nguyen
(74) Attorney, Agent, or Firm—MacMillan, Sobanski & Todd, LLC

(57) ABSTRACT

A control valve for controlling fluid flow in a hydraulic control unit of a vehicular brake system includes a valve seat having a longitudinal fluid passage terminating in an opening. The valve seat also includes a planar seat formed on an outer surface of a terminus of the valve seat. The opening is formed in the seat. A sloping surface surrounds the seat. An angle is formed between a line coplanar with the seat and the sloping surface. The angle ranges between approximately 3.5 degrees and 4.5 degrees. A sleeve is mounted on the valve seat. An armature is slidably received in the sleeve. This control valve is particularly adapted to be mounted in a bore of a housing of a hydraulic control unit of an electronically controlled vehicular brake system.

11 Claims, 3 Drawing Sheets

CONTROL VALVE WITH REDUCED SEAT FOR A HYDRAULIC CONTROL UNIT

CROSS REFERENCE TO RELATED APPLICATIONS

This is related to U.S. patent applications identified as Application Number 09/340,492, filed Jun. 30, 1999.

BACKGROUND OF THE INVENTION

This invention relates in general to vehicular brake systems, and in particular is concerned with a control valve mounted in a hydraulic control unit of an electronically controlled brake system.

Electronically-controlled brake systems for vehicles are well known. One type of electronically-controlled brake system includes a hydraulic control unit (HCU) connected in fluid communication between a master cylinder and a plurality of wheel brakes. The HCU includes a housing containing control valves and other components for selectively controlling hydraulic brake pressure at the wheel brakes.

Control valves for HCU's are commonly formed as electronically actuated solenoid valves. A typical solenoid valve includes a cylindrical armature slidably received in a sleeve or flux tube for movement relative to a valve seat. A spring is used to bias the armature in an open or closed position, thereby permitting or blocking fluid flow through the valve, respectively. A coil assembly is provided about the sleeve. When the valve is energized, an electromagnetic field or flux generated by the coil assembly slides the armature from the biased open or closed position to a closed or open position, respectively.

Control valves mounted in a HCU are actuated by an electronic control module to provide desired braking functions such as anti-lock braking, traction control, and vehicle stability control.

To provide desired braking responses, an armature must respond quickly and in a predictable manner to an electromagnetic field generated by an energized coil assembly.

SUMMARY OF THE INVENTION

This invention relates to a control valve mounted in a hydraulic control unit of a vehicular brake system. The control valve includes a reduced seat formed on an outer surface of a valve seat. The control valve delivers consistent operation under a range of temperatures. Furthermore, fluid flowing through the control valve produces less noise.

In a preferred embodiment, a control valve for controlling fluid flow in a hydraulic control unit of a vehicular brake system includes a valve seat having a longitudinal fluid passage terminating in an opening. The valve seat also includes a planar seat formed on an outer surface of a terminus of the valve seat. The opening is formed in the seat. A sloping surface surrounds the seat. An angle is formed between a line coplanar with the seat and the sloping surface. The angle ranges between approximately 3.5 degrees and 4.5 degrees. A sleeve is mounted on the valve seat. An armature is slidably received in the sleeve.

This control valve is particularly adapted to be mounted in a bore of a housing of a hydraulic control unit of an electronically controlled vehicular brake system.

Various objects and advantages of this invention will become apparent to those skilled in the art from the following detailed description of the preferred embodiment, when read in light of the accompanying drawings.

DETAILED DESCRIPTION OF THE PREFERRED EMBODIMENTS

Figure 1:
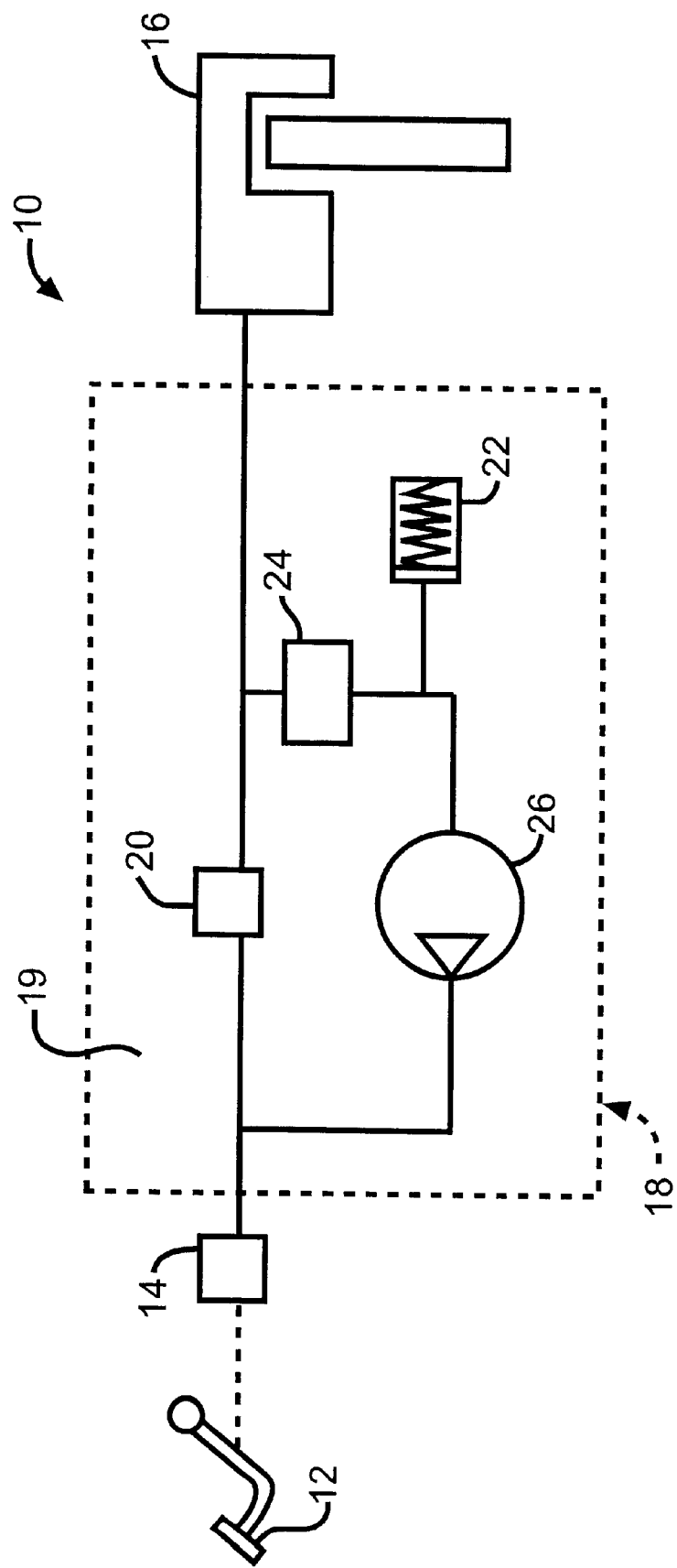
FIG. 1 is a schematic diagram of a vehicular braking system according to the present invention illustrating a hydraulic control unit having a normally open control valve, a normally closed control valve, an accumulator, and a pump.

A vehicular brake system according to this invention is indicated generally at 10 in FIG. 1. System 10 includes valves and other components described below to provide an anti-lock braking function. In other embodiments, system 10 can also include components to provide traction control and/or vehicle stability control fucunctions. In yet other embodiments, system 1 can be formed as an electronic brake management system.

The brake system 10 includes a brake pedal 12 connected to a master cylinder 14 for providing pressurized brake fluid to a plurality of wheel brakes 16, only one of which is shown. The wheel brake 16 is illustrated as a disc brake. However, the wheel brake 16 may be any type found on vehicles, including a drum brake.

The brake system 10 also includes a hydraulic control unit (HCU) 18 connected in fluid communication between the master cylinder 14 and each wheel brake 16. The HCU 18 includes a housing 19 having bores for receiving control valves and other components described below. Fluid conduits are provided between the bores to provide fluid communication between the valves and other components. For purposes of clarity of illustration, only one set of components are illustrated in FIG. 1. Typically, however, the HCU 18 also houses corresponding components for other circuits and/or wheels of the vehicle.

The HCU 18 includes a normally open control valve 20, commonly known as an isolation valve, disposed between the master cylinder 14 and the wheel brake 16, at least one low pressure accumulator 22, a normally closed control valve 24, commonly known as a dump valve, disposed between the wheel to brake 16 and the low pressure accumulator 22, and a hydraulic pump 26 connected between the low pressure accumulator 22 and an inlet to control valve 20. The HCU 18 may also include other fluid flow devices such as an attenuator, restricted orifices, and check valves (none of which are illustrated), depending upon the system design. Control valve 20 is preferably formed as a solenoid valve switchable between two positions. Control valve 24 is preferably formed as a solenoid valve switchable between two positions. Valves 20 and 24, as well as pump 26, are electrically connected to an electronic control module (not illustrated) and operated to provide desired system braking in a well-known manner.

Figure 2:
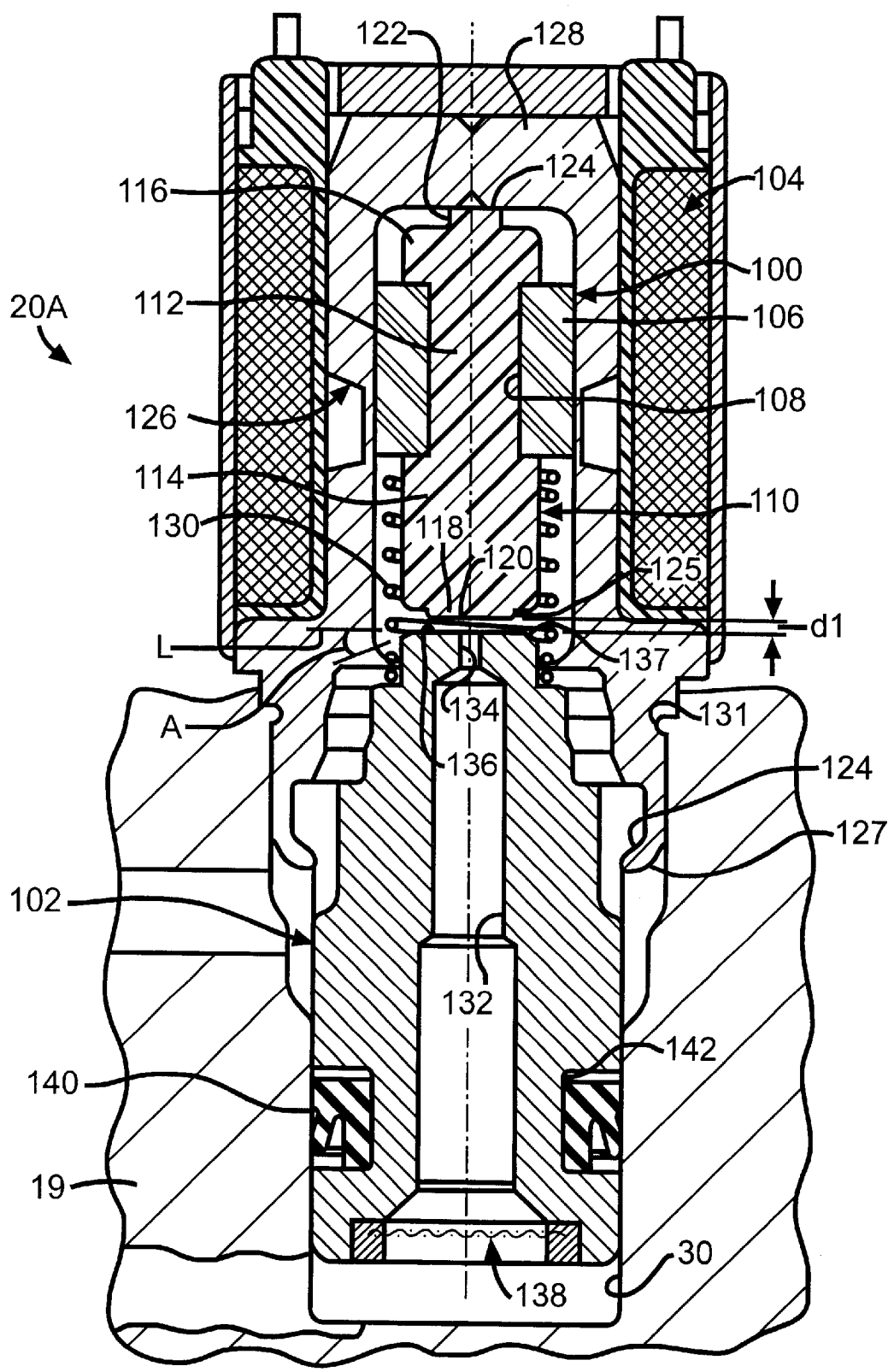
FIG. 2 is a sectional view through the hydraulic control unit of FIG. 1 illustrating a first embodiment of the normally open control valve according to this invention.

A sectional view of a first embodiment of the isolation valve 20 is indicated generally at 20A in FIG. 2. The isolation valve 20A is received in a bore 30 formed in the housing 19. As described below in detail, the isolation valve 20A includes an armature 100 biased away from a valve seat 102 when the valve 20A is not energized. When a coil assembly 104 is energized to produce an electromagnetic field, the armature 100 is pulled toward the valve seat 102 to close fluid flow through the valve 20A.

The armature 100 is formed as a subassembly and then assembled with the remainder of the valve 20A. The armature 100 includes an armature core 106 formed as a hollow cylinder from a ferromagnetic material. Preferably, each end of the armature core 106 is a planar surface. The armature core 106 includes a longitudinal (preferably axial) passage 108. The longitudinal passage 108 can be formed as a bore. Preferably, the longitudinal passage 108 is formed with a constant diameter.

The armature 100 also includes an armature body 110. Preferably, the armature body 110 is formed from a molded material such as polyphenylene sulfide (PPS) or polythalamide (PPA). The armature core 106 can be placed in a mold. Then the desired material can be injected into the mold to form the armature body 110. The armature body 110 includes a central section 112 that fills the longitudinal passage 108 of the armature core 106. A first end section 114 and a second end section 116 are formed at opposite ends of the central section 112. Each of the first and second end sections 114 and 116 extend beyond an end surface of the armature core 106 a predetermined distance. Each of the first and second end sections 114 and 116 has an outer diameter less than an outer diameter of the armature core 106. The outer diameters of the first and second end sections 114 and 116 are greater than an outer diameter of the central section 112. The first end section 114 preferably terminates in a projecting stub 118. The stub 118 preferably terminates in a planar end surface 120. The second end section 116 preferably terminates in a projecting stub 122. The stub 122 preferably terminates in a planar end surface 124. This formation and structure can be described as an armature core 106 having an overmolded armature body 110.

An annular undercut or groove 125 is formed about the planar end surface 120. Material from the first end section 114 is removed so that a terminating portion of the first end section 114 has a diameter less than the balance of the first end section 114. In other words, the groove 125 forms a reduced-diameter step at the terminus of the first end section 114.

The armature 100 is slidably received in a sleeve or flux tube 126 having a closed end 128. A spring 130 biases the armature 100 away from the valve seat 102. An annular portion 127 adjacent an open end of the sleeve 126 is crimped onto an annular flange 129 formed on the valve seat 102. The combined sleeve 126 and valve seat 102 containing the armature 100 is retained in the bore 30 by any desired means including material of the housing 19 forced into a groove 131 formed in the outer surface of the sleeve 126.

The valve seat 102 includes a longitudinal fluid passage 132 that terminates in a reduced diameter opening 134. A planar seat 136 is formed on an outer surface of a terminus of the valve seat 102 adjacent the armature 100. The reduced diameter opening 134 is formed in the seat 136. A sloping surface 137 surrounding the seat 136 forms an angle A as measured from a line L coplanar with the seat 136 to the sloping surface 137. Preferably, the angle A ranges between approximately 3.5 degrees and 4.5 degrees. Most preferably, the angle A is approximately 4 degrees.

The planar end surface 120 of stub 118 acts as a valve sealing element and engages the seat 136 when the armature 100 moves downwardly. When the stub 118 engages the seat 136, flow through fluid passage 132 and opening 134 is blocked. When the coil assembly 104 is not energized, the planar end surface 120 is spaced a distance dl from the seat 136. At this position, the planar end surface 124 engages an inner surface of the closed end 128.

A filter assembly 138 is provided adjacent an inlet of the fluid passage 132. A lip seal 140 is provided in a groove 142 formed in an outer surface of the valve seat 102.

The armature 100 provides a responsive, economical element that reciprocates in the sleeve 126 during operation of the valve 20A to provide desired braking responses in the system 10.

Figure 3:
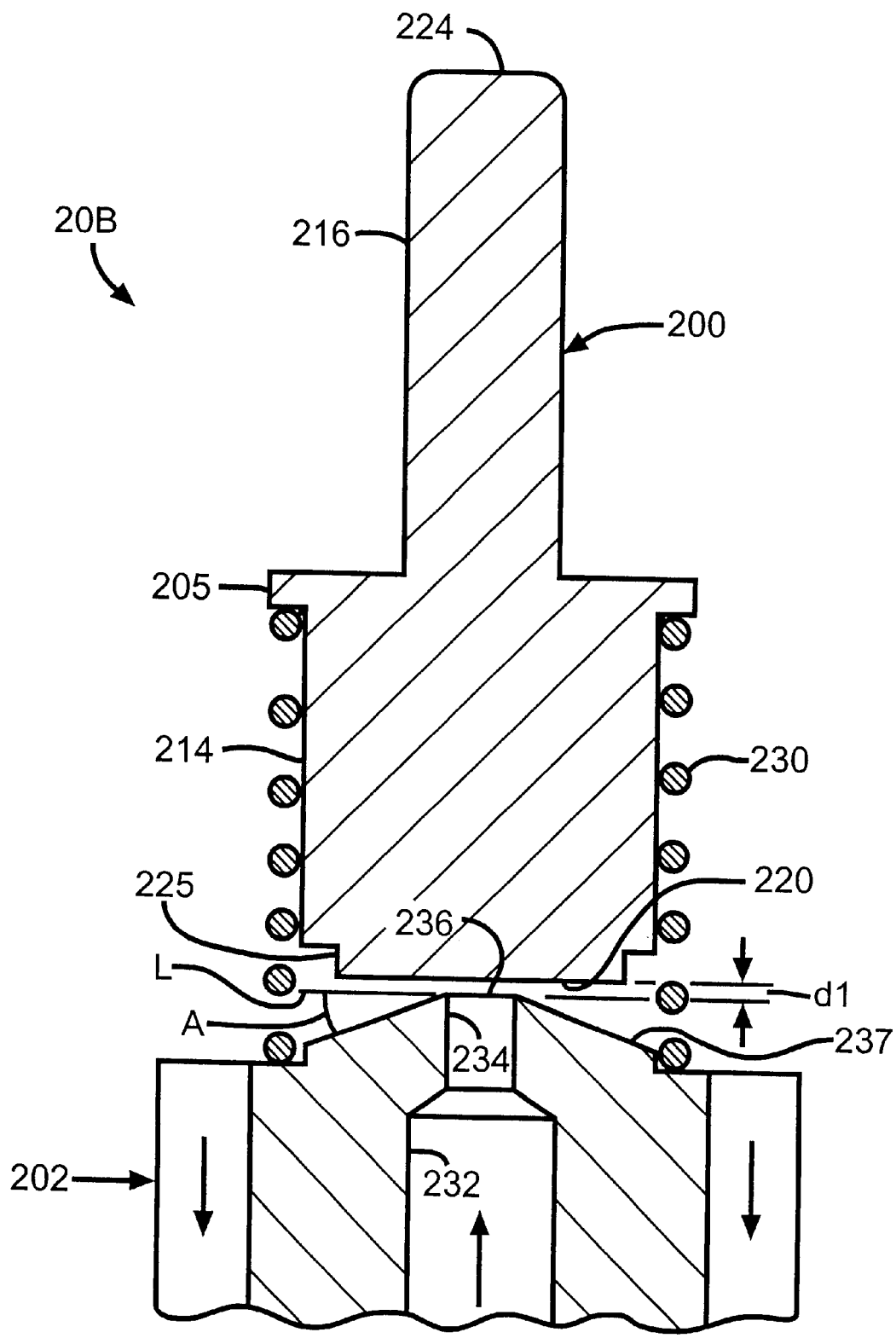
FIG. 3 is a sectional view through a second embodiment of an armature and valve seat according to this invention, removed from the remainder of a control valve.

A sectional view of a portion of a second embodiment of the isolation valve 20 is indicated generally at 20B in FIG. 3. The isolation valve 20B includes an armature 200 normally spaced from a valve seat 202 by a spring 230. To emphasize these elements, the remainder of control valve 20B is not illustrated in FIG. 3. However, elements such as the sleeve 126 and the coil assembly 104 of control valve 20A are combined with the armature 200 and valve seat 202 to complete the control valve 20B.

The armature 200 includes a central, annular flange 205. A first end section 214 and a second end section 216 are formed on opposite sides of the central flange 205. The first end section 214 preferably terminates in a planar end surface 220. The second end section 216 preferably terminates in a planar end surface 224. An annular undercut or groove 225 is formed about the planar end surface 220. Material from the first end section 214 is removed so that a terminating portion of the first end section 214 has a diameter less than the balance of the first end section 214. In other words, the groove 225 forms a reduced-diameter step at the terminus of the first end section 214.

The valve seat 202 includes a longitudinal fluid passage 232 that terminates in a reduced diameter opening 234. A planar seat 236 is formed on the outer surface of a terminus of the valve seat 202 adjacent the armature 200. The reduced diameter opening 234 is formed in the seat 236. A sloping surface 237 surrounding the seat 236 forms an angle A as measured from a line L coplanar with the seat 236 to the sloping surface 237. Preferably, the angle A ranges between approximately 3.5 degrees and 4.5 degrees. Most preferably, the angle A is approximately 4 degrees.

The planar end surface 220 of the armature 200 acts as a valve sealing element and engages the seat 236 when the armature 200 engages the valve seat 202. When the coil assembly (not illustrated) is energized and the armature 200 engages the seat 236, flow through fluid passage 232 and opening 234 is blocked. When the coil assembly (not illustrated) is not energized, the planar end surface 220 is spaced a distance dl from the seat 236.

As the isolation valves 20A and 20B cycle from open to closed to open positions, fluid flow past armatures 100, 200 is altered, creating Bernoulli forces that tend to pull the armatures 100, 200 toward their respective valve seats 102, 202. When the isolation valves 20A and 20B are reopened, these Bernoulli forces must be overcome, which takes additional time and requires additional force. Such factors negatively impact the performance of the control valve and overall performance of the hydraulic braking system 10. The edge grooves 125, 225 modify fluid flow and reduce Bernoulli forces during normal braking events, thereby improving response time and decreasing stopping distance. The edge grooves 125, 225 provide a consistent performance from the control valves 20A, 20B, even when the temperature and tolerances vary, by redirecting fluid flow.

During a controlled braking event such as an ABS event, the isolation valve 20A, 20B must be opened after the coil subassembly 104 has drawn the armature 100, 200 onto the valve seat 102, 202. Bernoulli forces advantageously hold the control valves 20A and 20B partially open, decreasing demand on the coil subassembly 104.

The angle A is less than that found on prior art control valves. This reduced angle A throttles fluid flow and provides a relatively high level of Bernoulli force, thus reducing pressure re-apply per pulse, flow, and noise during ABS operation. Furthermore, the reduced angle A provides adequate opening force at a fully open position of the control valves 20A and 20B.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A control valve for controlling fluid flow in a hydraulic control unit, comprising:
   a valve seat having a longitudinal fluid passage terminating in an opening, a planar seat formed on an outer surface of a terminus of the valve seat, wherein the opening is formed in the seat, and a sloping surface surrounding the seat, wherein an angle is formed between a line coplanar with the seat and the sloping surface, wherein the angle ranges between approximately 3.5 degrees and 4.5 degrees;
   a sleeve mounted on the valve seat; and
   an armature slidably received in the sleeve.

2. The control valve defined in claim 1 wherein the angle is approximately 4 degrees.

3. The control valve defined in claim 1 wherein the armature includes a first end section terminating in a planar surface that selectively engages the seat, wherein an edge groove is formed about the planar surface.

4. The control valve defined in claim 3 wherein the first end section is formed from a moldable material.

5. The control valve defined in claim 3 wherein the edge groove is effective to modify fluid flow and reduce Bernoulli forces when the control valve is in an open position.

6. The control valve defined in claim 1 wherein the control valve is a normally open valve.

7. A hydraulic control unit, comprising:
   a housing;
   a bore formed in the housing;
   a valve seat received in the bore, a valve seat having a planar seat formed on an outer surface of a terminus of the valve seat and a sloping surface surrounding the seat, wherein an angle is formed between a line coplanar with the seat and the sloping surface, wherein the angle ranges between approximately 3.5 degrees and 4.5 degrees;
   a sleeve secured to the housing over the valve seat; and
   an armature core slidably received in the sleeve.

8. The hydraulic control unit defined in claim 7 wherein the angle is approximately 4 degrees.

9. The hydraulic control unit defined in claim 7 wherein the armature includes a first end section terminating in a planar surface that selectively engages the seat at a first extreme of travel of the armature and is spaced apart from the seat at a second extreme of travel of the armature, wherein an edge groove is formed about the planar surface, the edge groove being effective to modify fluid flow and reduce Bernoulli forces when the armature is spaced apart from the seat at the second extreme of travel of the armature.

10. The hydraulic control unit defined in claim 9 wherein the first end section is formed from a moldable material.

11. The hydraulic control unit defined in claim 7 wherein the hydraulic control unit further includes a moving valve element cooperating with the valve seat to define a normally open valve.

* * * * *